D. H. TWAITS.
GREASE CUP BODY.
APPLICATION FILED JAN. 17, 1914.

1,201,992.

Patented Oct. 17, 1916.

Witnesses
Roe J. Johnston
Justin W. Macklin

Inventor
Daniel H. Twaits,
By Albert H. Bates,
Atty

UNITED STATES PATENT OFFICE.

DANIEL H. TWAITS, OF CHICAGO, ILLINOIS.

GREASE-CUP BODY.

1,201,992.  Specification of Letters Patent.  Patented Oct. 17, 1916.

Application filed January 17, 1914. Serial No. 812,721.

*To all whom it may concern:*

Be it known that I, DANIEL H. TWAITS, a citizen of the United States, residing at Chicago, in the county of Cook and State of Illinois, have invented a certain new and useful Improvement in Grease-Cup Bodies, of which the following is a full, clear, and exact description, reference being had to the accompanying drawings.

This invention relates to grease cup bodies of a type having an enlarged head threaded externally to receive the internal threads of a suitable cap and a stem threaded at its lower end and having an intermediate angular portion.

The general object of the invention is to provide a strong, durable body of this nature, which shall be efficient in service and very cheaply manufactured.

A further object is to provide the head with a resilient portion engaging the interior of the cup to prevent the leakage of grease past the head, and to provide a support for either side of the resilient portion so arranged that the head may be simple of construction.

My invention is hereinafter more fully described in connection with the drawings and the essential characteristics set forth in the claims.

Figure 1:
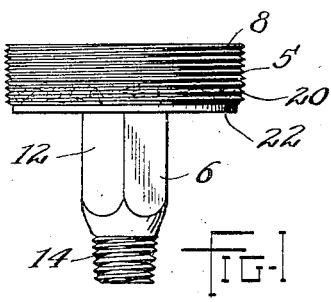
Figure 2:
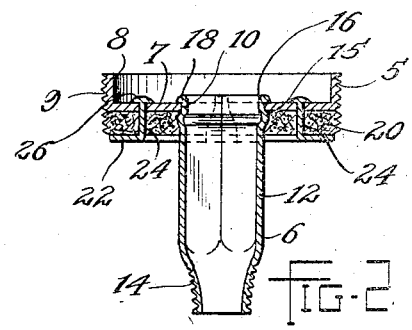
Figure 3:
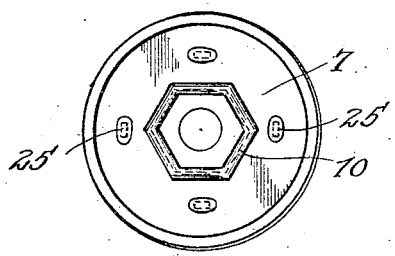
Figure 5:
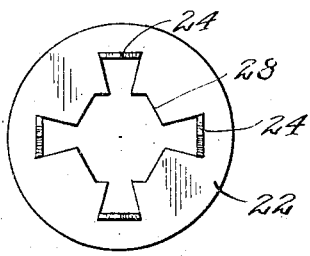
Figure 4:
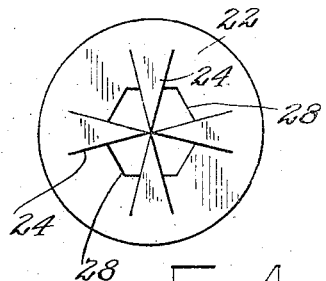

Figure 1 is a side elevation of my grease cup body; Fig. 2 is a vertical central section of the same; Fig. 3 is a plan of the same; Fig. 4 is a plan of the washer-like support for the lower side of the resilient member showing the lines on which it is cut, when being formed; Fig. 5 is a plan of the same before being applied to the body.

The grease cup body comprises essentially two parts—a head 5 and a stem or shank 6, which are securely held together in a manner hereinafter described.

The head portion 5 preferably comprises a shallow cup-like member having a bottom portion 7 and an upwardly turned flange 8, which is externally threaded at 9 to receive the internal threads of a suitable cap member. The bottom 7 is provided with a central angular opening 10, preferably hexagonal, which is adapted to receive the stem 6. This portion of the head may be conveniently pressed from sheet metal and the angular opening 10 very readily punched through the bottom 7.

The stem 6 comprises a tube having an angular portion 12 also hexagonal, and of such size as to tightly fit into the opening 10. Below the angular portion the stem is preferably reduced and threaded, as at 14. Near the upper end of the angular portion of the stem is formed an outwardly projecting bead 15, which is adapted to engage the under side of the bottom 7, while a portion 16 of the stem extends through this opening and is upset, as at 18, spreading the metal outwardly to engage the upper side of the bottom adjacent the opening, thus securely holding the stem member to the bottom member 7.

Beneath the cup member is a resilient member 20, preferably of leather or like material, which is of such a diameter that its periphery will conform, when screwed in place, to the threads of the cap member. This member is supported on its lower side by a washer-like metal member 22, having a central angular opening engaging the angular portion 12 of the stem and having pressed therefrom upwardly extending lugs or fingers 24. These are preferably wedge-shaped, and are passed through the resilient member and through openings 25 in the bottom portion 7 of the cup member, and are upset at their upper ends, as at 26, to securely hold the washer in place. The diameter of this member is preferably such that its periphery clears the threads on the interior of the cup member.

Fig. 4 shows the lines on which the metal is cut to form this member, 22, the lugs or fingers 24, being first cut, on the lines indicated, and then the central opening which fits the exterior of the angular portion 12 is cut, as indicated at 28. Fig. 5 shows a plan of the member after the central opening and lugs are pressed therefrom, the lugs being left integral and pressed upwardly as shown, in readiness to be pressed through the resilient member and into the openings 25, as described.

From the foregoing description it will be seen that I have provided a durable, efficient and simple grease cup body, and accomplished the desired results heretofore mentioned.

Having thus described my invention, what I claim is:

1. A grease cup body comprising an externally threaded head member, a tubular stem rigid therewith, a resilient washer beneath said head, a disk-like member beneath said washer, and projections extending from one of said members and through the other and being upset to secure the resilient washer in position.

2. A grease cup body comprising a head, a stem having an angular exterior rigid with said head, a resilient member under said head member, and a washer-like member around said stem engaging the under side of the resilient member and having means extending through said resilient member and engaging the head.

3. In a grease cup body, the combination of an externally threaded head, a stem rigid therewith, a resilient member of substantially the same diameter as the threaded head and resting against one side thereof, and a washer-like member on the other side of the resilient member having lugs integral therewith extending through the resilient member and engaging the head.

4. In a grease cup body, the combination of a head member externally threaded and having a central opening and other openings therethrough, a hollow stem engaging said central opening, a resilient member surrounding said stem and resting against said head member, and a washer surrounding the stem and resting against the under side of the resilient member, said washer having lugs pressed therefrom and integral therewith extending through the resilient member and through said other openings in the head member and being distorted to engage the head member.

5. In a grease cup body, the combination of a head member having external threads and a series of openings therethrough, a stem rigid with the central portion of the head member, a resilient member surrounding said stem and having substantially the same diameter as the head member, a washer-like member surrounding the stem having substantially wedge-shaped fingers pressed therefrom and bent upwardly, extending through the openings in the head member and being upset on the upper side of the head member to securely hold the washer and resilient member in place.

6. In a grease cup body, the combination of a stem and a head comprising a disk rigid with the stem, a resilient member on one side of the disk and a second disk on the other side of the resilient member, and separated projections integral with one of the disks and engaging the other.

7. In a grease cup body, the combination of a stem and a head comprising an externally threaded disk rigid with the stem, a resilient member beneath said disk, and a member beneath said resilient member and having projections engaging the disk whereby the resilient member is held in place.

8. In a grease cup body, the combination of a hollow stem, an externally threaded head rigid with the stem, a resilient washer surrounding the stem and abutting the under side of the head, a metal washer embracing the exterior of the stem and resting against the under side of the resilient washer, and means formed by upsetting portions of the last mentioned washer for securing it in place.

9. In a grease cup body, the combination of a stem and a head comprising a disk rigid with the stem, a resilient member on one side of the disk, a washer-like member engaging the other side of the resilient member, and lugs turned from the washer-like member to secure the same in place.

10. In a grease cup body, the combination of a stem and a head comprising a disk having a threaded periphery and having a central opening embracing the stem, said stem having a bead engaging one side of the disk and outwardly turned portions engaging the other side whereby the disk is held in place, a resilient member contiguous with the disk, and a second member having lugs adapted to hold the resilient member in place.

11. In a grease cup body, the combination of a stem and a head comprising a disk rigid with the stem, a resilient member on one side of the disk, a washer-like member engaging the other side of the resilient member, and lugs for securing the washer-like member in position.

12. In a grease cup, the combination of a stem, a head rigid with the upper portion of the stem, a resilient ring of substantially the same diameter as the head at one side thereof, a retaining member engaging said resilient ring, and means formed by upsetting metal for securing said retaining member in position.

13. In a grease cup body, the combination of a tubular stem, an outwardly extending head at the upper portion of the stem having threads on its periphery, a resilient member at one side of said head and adapted to engage the threads which the threads of the head engage, a disk separate from the stem adjacent the resilient member, and means for securing said disk in position against said resilient ring.

14. The combination of a stem, a head secured thereto and having a metal disk-like portion, a fibrous washer lying against said disk-like portion, and tongues integral with said disk turned therefrom and extending through the washer and having their ends upset to hold the washer in position.

In testimony whereof, I hereunto affix my signature in the presence of two witnesses.

DANIEL H. TWAITS.

Witnesses:
C. H. CRONK,
GEO. H. HALE.